United States Patent [19]

Doi et al.

[11] Patent Number: 5,742,746
[45] Date of Patent: Apr. 21, 1998

[54] CHARACTER OUTPUT CONTROL METHOD AND APPARATUS FOR TERMINAL

[75] Inventors: Hitoshi Doi; Masayoshi Okutsu, both of Yokohama, Japan

[73] Assignee: Digital Equipment Corporation, Maynard, Mass.

[21] Appl. No.: 952,863

[22] PCT Filed: May 28, 1991

[86] PCT No.: PCT/JP91/00708

§ 371 Date: Nov. 24, 1992

§ 102(e) Date: Nov. 24, 1992

[87] PCT Pub. No.: WO91/19275

PCT Pub. Date: Dec. 12, 1991

[30] Foreign Application Priority Data

May 30, 1990 [JP] Japan ................. 2-140578

[51] Int. Cl.$^6$ ........................................ G06K 15/00
[52] U.S. Cl. ................................ 395/115; 395/110
[58] Field of Search .................... 395/100, 101, 395/109, 110, 114, 115, 116, 150, 501, 507, 508, 511, 514, 167; 358/404, 444, 467, 261.4, 470; 345/192, 195, 467

[56] References Cited

U.S. PATENT DOCUMENTS

| 4,051,457 | 9/1977 | Inose et al. ................ 369/900 |
|---|---|---|
| 4,648,069 | 3/1987 | Funk et al. ................ 395/425 |
| 4,686,525 | 8/1987 | Nagata ................ 345/195 |
| 4,811,242 | 3/1989 | Adachi ................ 395/116 |
| 5,044,790 | 9/1991 | Kawamura ................ 395/110 |
| 5,093,903 | 3/1992 | Sudoh et al. ................ 395/110 |
| 5,297,246 | 3/1994 | Horiuchi et al. ................ 395/110 |
| 5,313,565 | 5/1994 | Mori ................ 395/110 |
| 5,579,449 | 11/1996 | Strobel ................ 395/110 |
| 5,592,593 | 1/1997 | Speed ................ 395/110 |
| 5,671,246 | 9/1997 | McIntyre ................ 395/115 |

FOREIGN PATENT DOCUMENTS

| 356 104 | 2/1990 | European Pat. Off. . |
| 2 218 550 | 11/1989 | United Kingdom . |

Primary Examiner—Dwayne Bost
Assistant Examiner—Tracy M. Legree
Attorney, Agent, or Firm—Ronald C. Hudgens; Diane C. Drozenski

[57] ABSTRACT

A terminal, such as character display unit or printer, has a character pattern memory region. A host system controls an operation of outputting a character to the terminal. In case of outputting a desired character to the terminal, firstly an examination is made at the side of the host system as to whether or not a character pattern corresponding to the desired character is stored in the character pattern memory region. When it is determined that the character pattern has not been stored in the character pattern memory region, the character pattern from the host system is loaded into the character pattern memory region.

5 Claims, 4 Drawing Sheets

CHARACTER OUTPUT CONTROL METHOD AND APPARATUS FOR TERMINAL

FIELD OF THE INVENTION

The present invention relates to a character output control method and apparatus for controlling from a host system the operation of outputting a character to a terminal, such as character display unit or printer, which has character pattern memory region for storing character patterns.

BACKGROUND ART

A terminal, such as display terminal or printer, of the character cell type has the function of displaying or printing a character pattern loaded from a host system or storing the character pattern in a character pattern memory region which is controlled as a cache (hereinbelow, the memory region shall be termed the "character pattern cache"). Techniques which control the operation of outputting a character to the terminal have heretofore been as follows:

(a) On-Demand Character Pattern Loading Technique based on Hardware

Software for controlling the terminal transmits character codes to-be-output to the terminal irrespective of whether or not the terminal has stored the character patterns. On this occasion, in a case where the terminal has not stored the character pattern, it notifies the software of the necessity of the character pattern. This shall be called the "character pattern request of the terminal". The notified software temporarily suspends the operation of outputting remaining characters, and it loads the requested character pattern corresponding to the character code and causes the terminal to display or print the character pattern, whereupon it restarts the operation of outputting the remaining characters. This technique shall be called the "on-demand character pattern loading technique based on hardware" in order to contrast it with the present invention.

(b) Collective Preloading Technique

All the character patterns which the user of the terminal requires are collectively loaded in the terminal beforehand, whereby character pattern loading is dispensed with in the subsequent operation of outputting characters. This technique shall be called the "collective preloading technique" in order to contrast it with the present invention.

In the prior-art technique (a), the on-demand character pattern loading technique based on hardware as stated above, there is the problem that the form and method in which the terminal is connected are limited. More specifically, in case of using this technique, the terminal 1 must be kept in direct connection with the host system 2 which has the character pattern loading control function as stated before, as shown by Connection Form 1 in FIG. 4 of the accompanying drawings. In other words, in a case where the terminal 1 is connected through another host system 3 such as a host system which does not have the character pattern loading function, as shown by connection Form 2 in FIG. 4, this technique cannot be used. Besides, in the connection of the terminal 1 through a terminal server device 4 or the like as shown by Connection Form 3 in FIG. 4, the communication protocols of the terminal server device 4 and between the terminal server device 4 and the host system 2 need to be expanded.

On the other in the prior-art technique (b) as stated above, there is the problem that the number of the character patterns which can be collectively loaded is limited by the size of the character pattern reserving zone of the terminal.

SUMMARY OF THE INVENTION

An object of the present invention is to provide a character output control method and apparatus for a terminal which can eliminate the aforementioned problems of the prior-art techniques.

According to an aspect of the present invention there is provided a character output control method for controlling from a host system an operation of outputting a character to a terminal, such as character display unit or printer, which has a character pattern memory region for storing character patterns, said method comprising the steps of, in case of outputting a desired character to said terminal, firstly examining at the side of said host system whether or not a character pattern corresponding to the desired character is stored in said character pattern memory region, and secondly loading the character pattern from said host system into said character pattern memory region when it is determined that the character pattern has not been stored in said character pattern memory region.

According to another aspect of the present invention there is provided a character output control apparatus for controlling from a host system an operation of outputting a character to a terminal, such as character display unit or printer, which has a read-only memory for storing character patterns, and a character pattern cache for storing character patterns loaded from the host system, said apparatus comprising an output character analysis section for analyzing each character code of output character data to be delivered from said host system to said terminal, thereby to examine whether or not a character pattern corresponding to the character code has been stored in said read-only memory, so that when it is determined that the corresponding character pattern has been stored in said read-only memory, the character code may be directly transmitted to said terminal; a character pattern cache emulation section for examining whether or not the corresponding character pattern is stored in said character pattern cache when said output character analysis section determines that the corresponding character pattern has not been stored in said read-only memory, so that when it is determined that the corresponding character pattern has been stored in said character pattern cache, the character code may be directly transmitted to said terminal, and then emulating said character pattern cache in accordance with the operation of outputting the character to said terminal; and a character pattern database retrieval section for retrieving the corresponding character pattern from a character pattern database prepared on the side of said host system and permitting it to be loaded into said character pattern cache when said character pattern cache emulation section determines that the corresponding character pattern has not been stored in said character pattern cache.

According to still another aspect of the present invention there is provided a character output control apparatus for controlling from a host system an operation of outputting a character to a terminal, such as character display unit or printer, which has a character pattern cache for storing character patterns loaded from the host system, said apparatus comprising a character pattern cache emulation section for analyzing each character code of output character data to be delivered from said host system to said terminal, thereby to examine whether or not a character pattern corresponding to the character code has been stored in said character pattern cache, so that when it is determined that the corresponding character pattern has been stored in said character pattern cache, the character code may be directly transmitted to said terminal and then said character pattern cache may be emulated in accordance with the operation of outputting the character to said terminal; and a character pattern database retrieval section for retrieving the corresponding character pattern from a character pattern database prepared on the side of said host system and permitting it to be loaded into said character pattern cache when said character pattern cache emulation section determines that the corresponding character pattern has not been stored in said character pattern cache.

The present invention will be described in more detail conjunction with the accompanying drawings.

DESCRIPTION OF THE PREFERRED EMBODIMENTS

Figure 1:
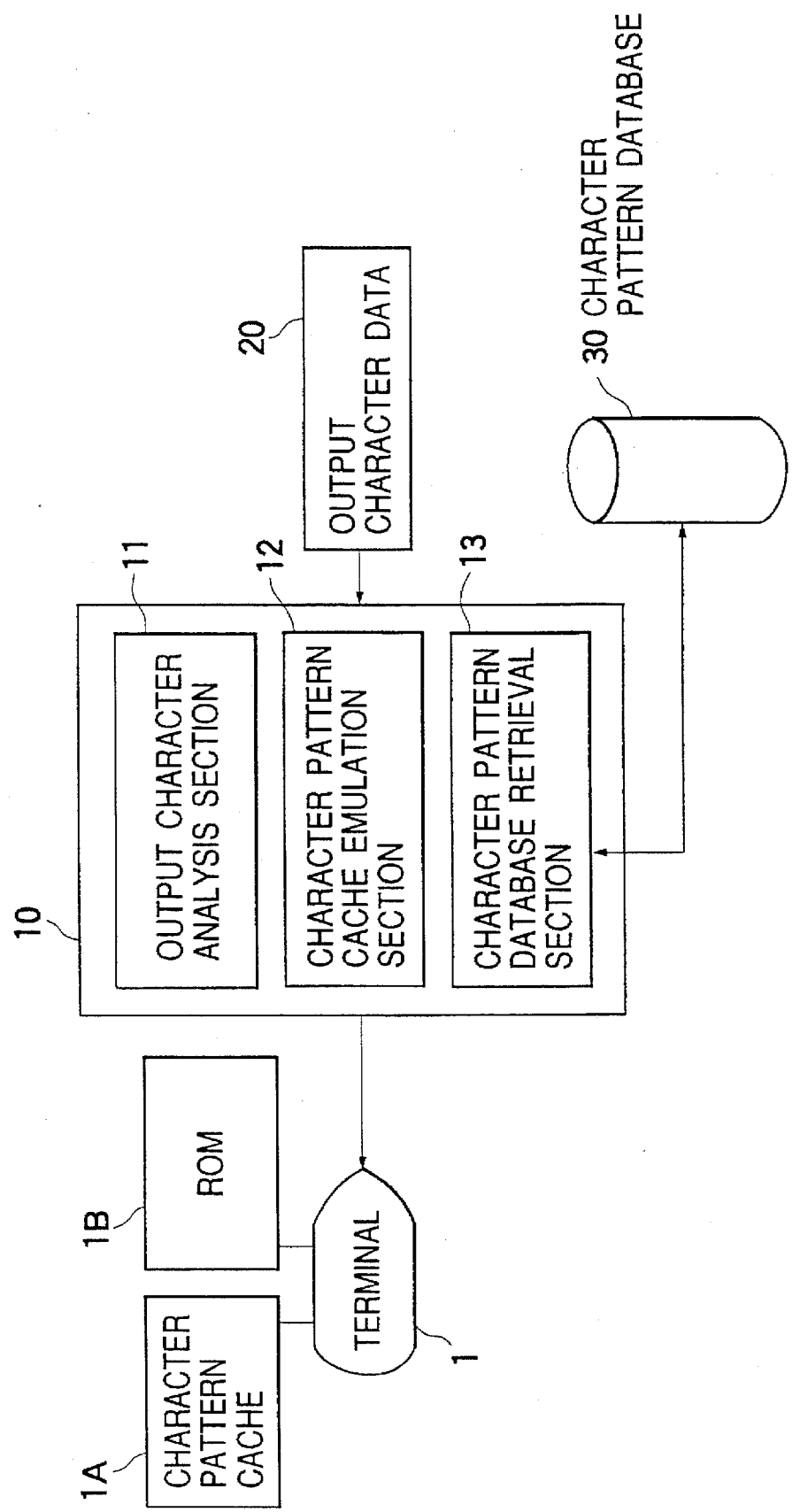
FIG. 1 is a block diagram showing the aspect of performance of the present invention.
Figure 2:
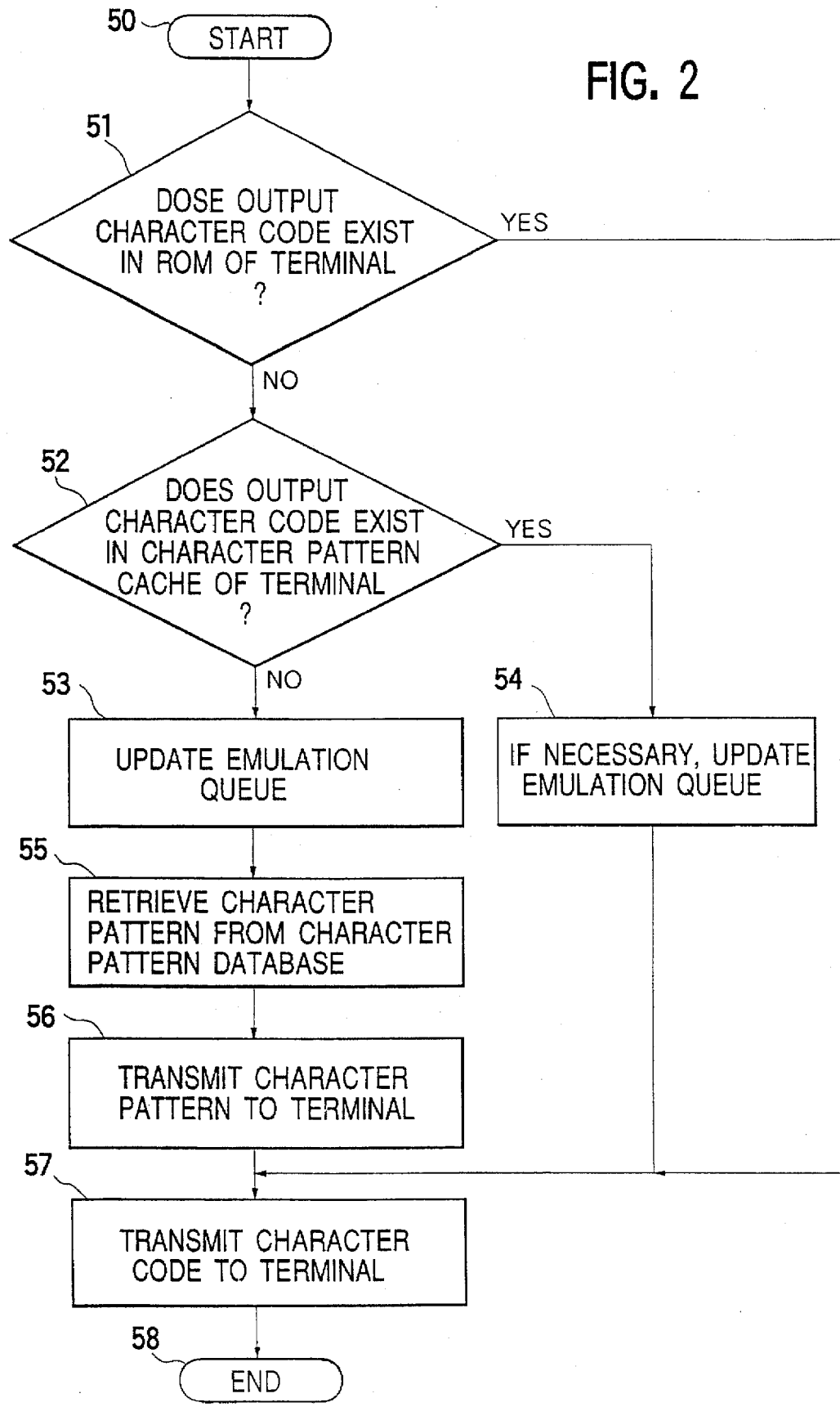
FIG. 2 is a diagram showing the flowchart of the processing of the control of the present invention.

Before the description of the more practicable embodiments of the method and apparatus of the present invention, the aspect of performance of the present invention and the flow of processing thereof will be elucidated with reference to FIGS. 1 and 2. FIG. 1 shows the aspect of performance of the present invention in terms of a block diagram, while FIG. 2 shows the flow of processing thereof in terms of a flowchart. As shown in FIG. 1, a terminal 1 has a character pattern cache 1A which serves to store and reserve character patterns loaded from a host system, and which is controlled by the LRU (Least Recently Used) method, the FIFO (First-In First-Out) method or the like. The number of the character patterns which can be reserved, differs depending upon the types of such terminals. Besides, the terminal 1 has a ROM (Read-Only Memory) 1B, in which character patterns are also reserved. Accordingly, when any character whose character pattern is held in the ROM 1B is to be output, the character pattern need not be loaded. In, for example, a terminal for the Japanese language, the ROM 1B of the terminal 1 reserves the character patterns of alphanumeric letters, characters stipulated in "JIS (Japanese Industrial Standard) X0208" (JIS "Kanjis"), etc.

In FIG. 1, functions to be fulfilled by a computer which is controlled by software (hereinbelow, termed the "terminal control software") in the host system in order to control the operation of outputting characters to such a terminal 1 in accordance with the present invention are put together and indicated within a functional block 10. That is, the functions to be effected by the computer in the present invention are chiefly divided into three elements; an output character analysis section 11, a character pattern cache emulation section 12, and a character pattern database retrieval section 13.

Next, the processing with the terminal control software according to the present invention will be explained with reference to the flowchart of FIG. 2.

The processing starts at a step 50 in FIG. 2. At a step 51, the output character analysis section 11 based on the terminal control software analyzes each character code of output character data sent as indicated by a block 20 in FIG. 1, to check if a character pattern corresponding to the character code exists in the ROM 1B of the terminal 1. In a case where the character pattern of the output character code exists in the ROM 1B, this output character code is directly transmitted to the terminal 1 via a step 57, on the other hand, in a case where the output character pattern does not exist in the ROM 1B, the character pattern cache emulation section 12 checks if the character pattern of the output character code exists in the character pattern cache 1A of the terminal 1, as indicated at a step 52. In a case where the character pattern exists in the character pattern cache 1A of the terminal 1, the character code is directly transmitted to the terminal 1 via the step 57. On this occasion, if necessary, the character pattern cache emulation section 12 updates data for emulating the character pattern cache 1A, as indicated at a step 54.

When it has been found that the character pattern of the character code to be output exists in neither of the ROM 1B and the character pattern cache 1A of the terminal 1, the character pattern database retrieval section 13 retrieves the required character pattern from a character pattern database 30 (in FIG. 1) prepared in the host system, as indicated at a step 55. Then, the terminal control software transmits the character pattern to the terminal 1 at a step 56 so as to load this pattern into the character pattern cache 1A. On this occasion, as indicated at a step 53, the character pattern cache emulation section 12 updates the data for emulating the character pattern cache 1A. Thereafter, the output character analysis section 11 transmits the character code to the terminal 1 at the step 57. The processing ends at a step 58.

The function of the present invention thus far described shall be called "software ODL (On-Demand Loading)".

Next, the more practicable embodiments of the present invention will be described by particular reference to FIG. 3.

Figure 3:
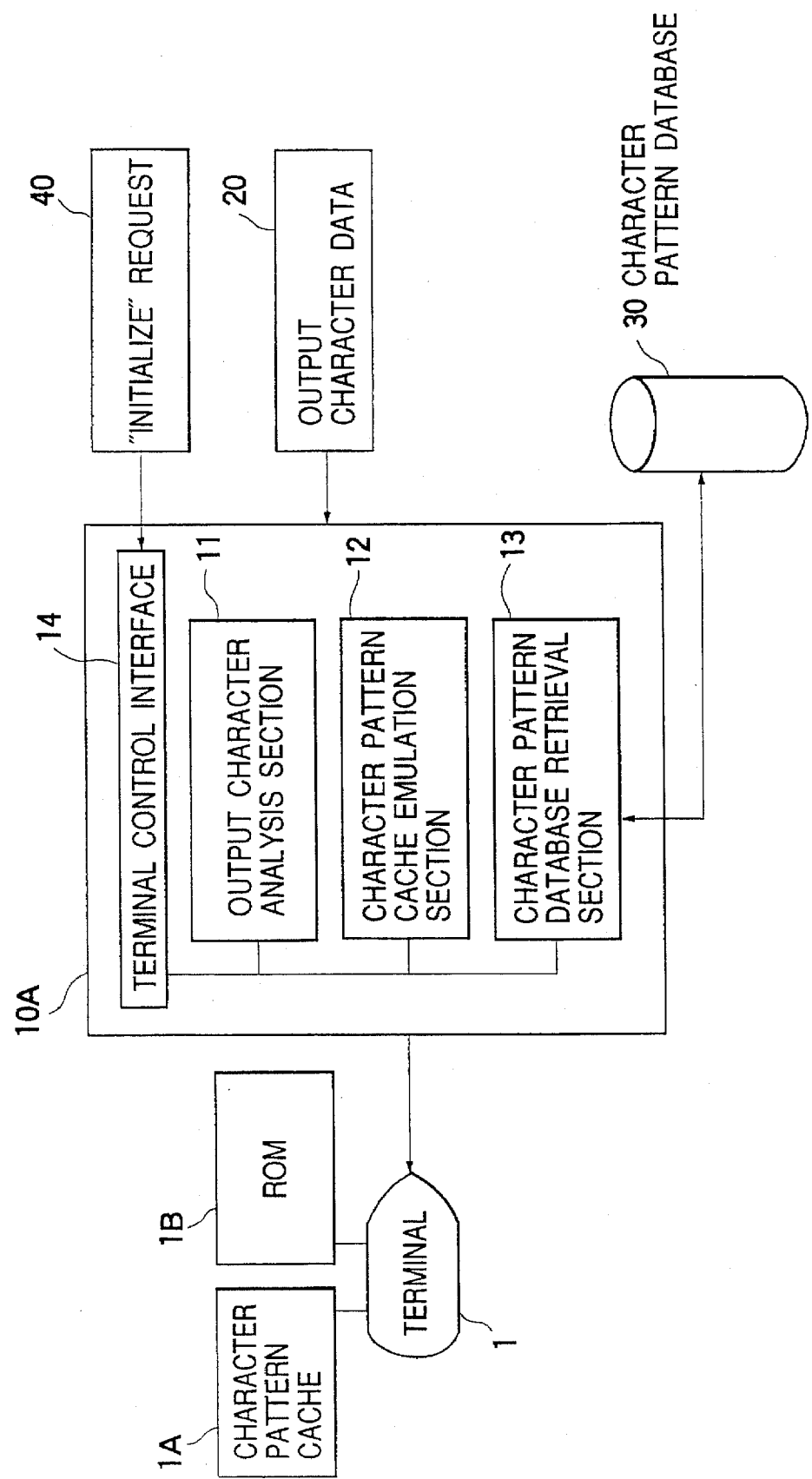
FIG. 3 is a block diagram showing a more practicable embodiment of the present invention.

FIG. 3 is a block diagram corresponding to FIG. 1, and the flow of processing in the embodiment shown in FIG. 3 is similar to that of the flowchart of FIG. 2. As indicated within a functional block 10A in FIG. 3, this embodiment includes an interface 14 for designating the control method of the functional block 10A from the user or application program of the terminal 1. With an "initialize" request 40 and using system commands, the user of the terminal 1 sets the filename of the character-pattern database 30 and a size (the maximum number of the elements of a queue) and a management method (such as the LRU method or the FIFO method) for the character pattern cache emulation in the terminal control software and notifies the terminal control software of the use of the software ODL function. The notified terminal control software 10A prepares and initializes a memory for the character pattern cache emulation, and executes initialization for retrieving the character pattern database 30.

When the software ODL function has been initialized, the terminal control software analyzes each character code of the output character data 20 for the terminal 1 by means of the output character analysis section 11. In this embodiment, the output character analysis section 11 holds the property of the output terminal 1 so as to be capable of previously identifying character codes which the connected terminal 1 reserves in its ROM 1B. In a case where the output character analysis section 11 has recognized the existence of the character pattern of the output character code in the ROM 1B, it immediately transmits the pertinent output character code to the terminal 1.

In a case where the output character code does not exist in the ROM 1B, the character pattern cache emulation section 12 is operated for checking if the output character pattern exists in the character pattern cache 1A of the terminal 1. This process is effected by searching the queue for emulating the character pattern cache 1A of the terminal 1. The existence of the output character code in the queue denotes that the character pattern of the output character code has been loaded in the terminal 1. When the output character code exists in the queue, the character pattern cache emulation section 12 updates the state of the queue. By way of example, in a case where the terminal 1 manages the character pattern cache 1A in accordance with the LRU method, the emulation section 12 moves the output character code to the head of the queue containing it, in order to emulate it. When the output character code does not exist in the queue, the character pattern cache emulation section 12 generates the elements of the queue anew and inserts them into the head of the queue in order to express a state in which the output character code has been loaded. On this occasion, however, when the number of the elements of the queue exceeds the maximum number thereof designated at the initialization, character codes to be expelled from the queue are determined according to the management method (such as LRU or FIFO method) and are deleted from the queue, whereupon the new queue elements are inserted. The character pattern cache emulation section 12 notifies the output character analysis section 11 of whether or not the character pattern of the output character code exists.

When the output character pattern exists in the terminal 1, the notified output character analysis section 11 transmits the output character code to the terminal 1. On the other hand, when the output character pattern does not exist in the terminal 1, the notified section 11 causes the character pattern database retrieval section 13 to retrieve the character pattern corresponding to the output character code and to transfer the pertinent character pattern to the terminal 1. After the transfer, the output character analysis section 11 transmits the output character code to the terminal 1. The terminal control software 10A repeats such series of processes for the individual character codes of the output character data.

Figure 4:
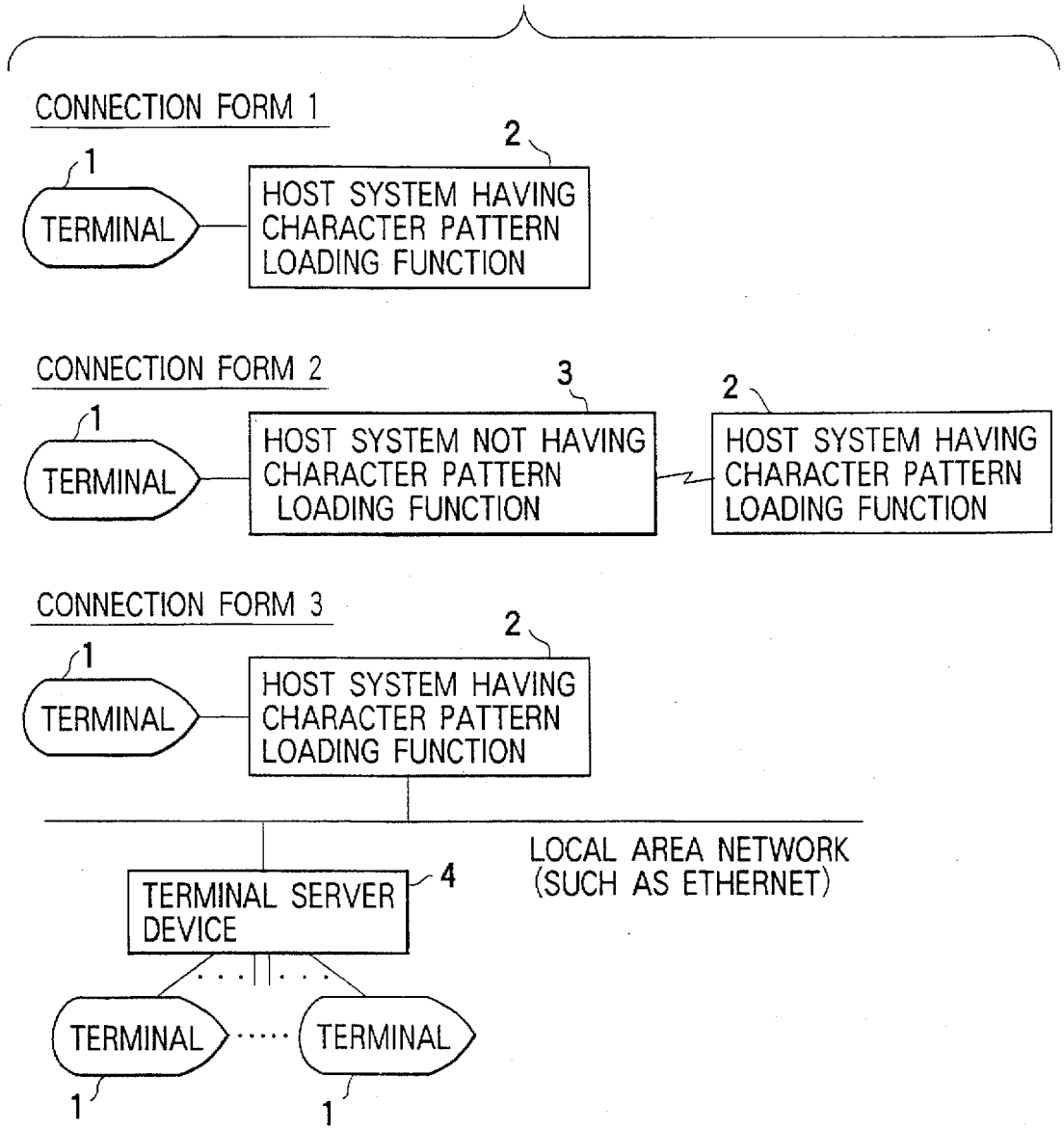
FIG. 4 is a block diagram showing several connection forms of terminals.

In the embodiment described above, the processing is entirely executed by the terminal control software 10A, so that it does not depend upon the form of the connection between the host system and the terminal. More specifically, even in the case (Connection Form 2 in FIG. 4) where the terminal is connected to another host system and is connected through this host system to the host system having the terminal control software, the function of the present invention can be fulfilled without any problem. Also, in the connection through the terminal server device or the like (Connection Form 3 in FIG. 4), the function of the present invention can be fulfilled without the necessity of expanding the communication protocols of the terminal server device and between this terminal server device and the host system. Further, since the terminal control software can cope with any size of the character pattern reserving zone possessed by the terminal, the processing is not limited by the capacity of the memory means at all. Moreover, as compared with that of the on-demand character pattern loading technique based on hardware, the transaction speed of the embodiment in the case where the terminal does not reserve the character pattern is higher because no interaction arises between the terminal and the software.

In the foregoing embodiment, the terminal control software lies at the hierarchic level of an operating system as called a device driver or an IO handler. The function of the present invention, however, can be performed even at another hierarchic level of software. More specifically, the function of the present invention is easily performed even in a programming library linked with an application program, and so forth.

As understood from the above description, with the character pattern loading according to the present invention, character patterns can be loaded without depending upon the connection form of a terminal and a host system and without being limited by the number of characters. Besides, protocols for a character pattern request need not be prepared, and the increase of a processing time period to be expended on a protocol exchange is not involved, either.

What is claimed is:

1. A character output control method for controlling, from a host system, an operation of outputting a character to a terminal, such as character display unit or printer, which has a character pattern memory region for storing character patterns, said method comprising the steps of:

examining a set of data stored in said host system, said set of data emulating said character pattern memory region, to determine whether or not a character pattern corresponding to the desired character is stored in said character pattern memory in the terminal; and loading the character pattern from said host system into said character pattern memory region when it is determined that the character pattern has not been stored in said character pattern memory region.

2. A character output control method as defined in claim 1, wherein said character pattern memory region is constructed of a character pattern cache.

3. A character output control method as defined in claim 1, wherein said character pattern memory region is constituted by a read-only memory and a character pattern cache.

4. A character output control apparatus for controlling from a host system an operation of outputting a character to a terminal, such as character display unit or printer, which has a read-only memory for storing character patterns, and a character pattern cache for storing character patterns loaded from the host system, said apparatus comprising:

an output character analysis means for analyzing each character code of output character data to be delivered from said host system to said terminal, thereby to examine a second set of data, which second set corresponds to that in the read-only memory, to determine whether or not a character pattern corresponding to the character code has been stored in said read-only memory, so that when it is determined that the corresponding character pattern has been stored in said read-only memory, the character code may be directly transmitted to said terminal;

a character pattern cache emulation means for examining whether or not the corresponding character pattern is stored in said character pattern cache when said output character analysis means determines that the corresponding character pattern has not been stored in said read-only memory, so that when it is determined that the corresponding character pattern has been stored in said character pattern cache, the character code may be directly transmitted to said terminal, and then emulating said character pattern cache in accordance with the operation of outputting the character to said terminal; and a character pattern database retrieval means for retrieving the corresponding character pattern from a character pattern database prepared on the side of said host system and permitting it to be loaded into said character pattern cache when said character pattern cache emulation means determines that the corresponding character pattern has not been stored in said character pattern cache.

5. A character output control apparatus for controlling from a host system an operation of outputting a character to a terminal, such as character display unit or printer, which has a character pattern cache for storing character patterns loaded from the host system, said apparatus comprising a character pattern cache emulation means for analyzing each character code of output character data to be delivered from said host system to said terminal, thereby to examine a first set of data, which first set of data emulates the character pattern cache, to determine whether or not a character pattern corresponding to the character code has been stored in said character pattern cache, so that when it is determined that the corresponding character pattern has been stored in said character pattern cache, the character pattern cache emulating means updating the first set of data which emulates said character pattern cache in accordance with the character code output to said terminal; and a character pattern database retrieval means for retrieving the corresponding character pattern from a character pattern database prepared on the side of said host system and permitting said corresponding character pattern to be loaded into said character pattern cache when said character pattern cache emulation means determines that the corresponding character pattern has not been stored in said character pattern cache.

\* \* \* \* \*